UNITED STATES PATENT OFFICE.

CLEON L. HILLS AND CARL CADY HILLS, OF BLOOMINGTON, ILLINOIS.

SELF-RAISING FLOUR.

SPECIFICATION forming part of Letters Patent No. 395,747, dated January 8, 1889.

Application filed February 16, 1888. Serial No. 264,236. (No specimens.)

*To all whom it may concern:*

Be it known that we, CLEON L. HILLS and CARL CADY HILLS, of Bloomington, in the county of McLean, and in the State of Illinois, have invented certain new and useful Improvements in Self-Raising Flour; and we do hereby declare that the following is a full, clear, and exact description thereof.

Our invention relates to an improvement in food compounds, the object of the same being to provide a food compound embodying various cereals and vegetables which undergo a certain treatment and mixture, after which the whole is adapted to be put into packages and upon the market.

With these ends in view our invention consists in the treatment and mixture of the various articles of food, as hereinafter described, in such proportions that the compound will possess due quantities of popped pop-corn, wheat-flour, potatoes, rice, baking-powder, and sugar.

The proportions of the constituents deemed most nourishing are as follows: Four and one-half pounds of popped corn, eighteen pounds of wheat-flour, one pound and a half of potatoes, one pound and a half of rice, one pound and a quarter of Royal baking-powder, three-quarters of a pound of sugar.

The compound is prepared as follows: The rice and potatoes are steamed, boiled, or baked, after which they are dried and ground. The corn is popped and ground. The flour, sugar, and baking-powder are used in their prepared condition.

The above compound is principally used for batter-cakes, and when so used should be seasoned with salt and a sufficient quantity of cold water added thereto to make a batter, the same being then ready for the griddle.

A food compound of this description has been found healthy and desirable.

The proportions may be varied, if desired.

Having fully described our invention, what we claim as new, and desire to secure by Letters Patent, is—

A self-raising flour consisting of ground popped pop-corn, wheat-flour, potato-flour, rice-flour, baking-powder, and sugar, substantially as described.

In testimony that we claim the foregoing we have hereunto set our hands, this 8th day of February, 1888.

CLEON L. HILLS.
    CARL CADY HILLS.

Witnesses:
  THOS. SLADE,
  A. E. SLADE.